United States Patent [19]

Biederman

[11] 3,708,663
[45] Jan. 2, 1973

[54] OPTICAL CEPHALOSTAT

[76] Inventor: William Biederman, 352 Hempstead Avenue, Rockville Centre, N.Y. 11570

[22] Filed: Aug. 11, 1971

[21] Appl. No.: 170,913

[52] U.S. Cl. .................................. 250/59, 250/65 R
[51] Int. Cl. ............................................ G03b 41/16
[58] Field of Search ............................ 250/59, 65 R

[56] References Cited

UNITED STATES PATENTS 2,376,836   5/1945   Tunnicliffe .......................... 250/65

Primary Examiner—James W. Lawrence
Assistant Examiner—C. E. Church
Attorney—Hubert T. Mandeville et al.

[57] ABSTRACT

Methods and apparatus are provided for the three-dimensional positioning by optical means of a head including simultaneous vertical and horizontal orientation for the taking sequentially of X-rays and/or photographs over a period of time in which the head is aligned exactly the same for each X-ray and/or photograph session in the sequence. In addition, preliminary substitution means are provided for aligning the apparatus prior to insertion of the head, thus eliminating prolonged exposure of a patient to positioning procedures requiring no motion and uncomfortable mechanical contact.

9 Claims, 8 Drawing Figures

INVENTOR.
WILLIAM BIEDERMAN

BY Mandeville &
Schweitzer

ATTORNEYS

OPTICAL CEPHALOSTAT

Generally speaking, this invention relates to methods and apparatus for use by anthropologists, orthodontists, dentists and other health specialists, as well as technicians and photographers, for positioning a patient's head for the X-raying or photographing thereof. More particularly, this invention relates to methods and apparatus for the precise orientation of the head both vertically and horizontally for the X-raying and/or photographing thereof. With such an arrangement, therefore, the operator can take a series of X-rays or photographs over a period of time sequentially, and have the patient's head always in precisely the same position for each X-ray or photograph, as well known. Even more particularly, this invention relates to methods and apparatus for such sequential X-raying and/or photographing of the head utilizing optical means for the orientation of the head substantially in the absence of the use of any mechanical clamping arrangements or devices for gripping the head, thus eliminating the discomfort usually associated with such devices in positioning the head.

As is well known, orthodontists (and other specialists of child growth), will take head X-rays of patients over a period of time in order to determine the effect of their treatment and/or work on a patient. In doing so, the head must be exactly oriented in the same position for each photograph or X-ray of the sequence, in order for the orthodontist or other health specialist to gauge the changes that have taken place, whether due to treatment or growth.

In the past, many devices have been developed for attempting to achieve this reorientation of a patient's head for each X-ray or photograph. However, these past devices utilize mechanical arrangements which necessitate gripping certain portions of the patient's anatomy in order to precisely orient the head. In doing so, certain discomfort may arise in that the auditory canals, the ear holes, are not exactly horizontal. The ear posts, almost universely used in orienting the head in mechanical cephalostats, are always horizontal; hence, if tightly applied, the patient is uncomfortable and tends to wiggle. If the ear posts are loose, exactitude is impaired. One early device, well known in the art is the Todd Head Spanner which utilized two ear posts for insertion into the meatus of the ear. However, since this device only used two points of measurement, it only determined the transmeatal axis, which in turn was utilized to measure distances to points in the midsagittal plane (a plane passing through the Braegma which is the uppermost point of the skull, the Nasion which is the Fronto-nasal suture, and the Menton, which is the lowest point on the chin, all of which are mid-points).

A further development in this art is a device called the Western Reserve Craniostat, which utilizes a third point called a Nasion rest which is a mechanical abutment against the bridge of the nose, which establishes a plane, which allows for the fixing of a dry skull. This latter fixation in the Frankfort horizontal plane which runs between the right and left porion, which are the high points of the auditory meati and passing through the left orbital, the low point in the bony orbit of the eye. With these arrangements, oriented X-rays are permitted of the living head utilizing ear posts and a Nasion rest to mechanically orient the head in the Frankfort position; that is, with the Frankfort plane, described above, disposed horizontally and parallel to the floor supporting the patient. Mechanical cephalostats are essentially based on the principles of the Western Reserve Craniostat.

As has been stated before, certain difficulties may arise with the utilization of these mechanical fixation devices. For example, the auditory meati are rarely, if ever, horizontal and perpendicular to the midsagittal plane, so that tight application of ear posts makes the patient uncomfortable and hence unsteady. If on the other hand, the ear posts are applied loosely, certain impairment takes place in the precision of the positioning of the patient. Obviously, every patient's integument or skin covering varies, which may cause another source of error since the mechanical device in pressing against the patient will move to varying degrees depending on the thickness of the integument. Also, the Nasion rest is against freely movable tissue with the result that there is always some freedom of movement.

A further potential source of error in prior art devices, is the impossibility of observing all three dimensions of the patient's head at the same time for taking an X-ray and/or photograph. In this connection, the attitude and/or position of the head may be described in terms of "pitch", "roll" and "yaw", with reference to three mutually perpendicular co-ordinants. When taking a film of the profile of the patient (lateral), only the height and depth of the head are seen. On the other hand, when taking the postero-anterior film (frontal or rear view), only the height and width are visible. In other words, when taking a profile or lateral view of the patient, only the pitch can be checked, whereas when taking a frontal or rear view of the patient, only the roll and yaw can be checked. In this connection, "pitch" is the up and down relationship to the Frankfort plane, "roll" is the sideways tilting of the head, and "yaw" is the turning of the head to the right or left.

Thus, the problem arises in the utilization of these mechanical devices that patients are subjected to a certain amount of discomfort when the mechanical devices are pressed against the head. Furthermore, even when there is an absence of discomfort on the part of the patient, there is a certain degree of error built into the utilization of mechanical devices merely because they press against a compressible portion of the integument, thus causing built-in error if the patient happens to move slightly during the exposure period. Furthermore, certain error may arise from the fact that not all three dimensions (that is both the horizontal and vertical orientation of the head) can be observed simultaneously during the actual taking of the X-ray.

By contrast, and quite unexpectedly, it has now been found in accordance with this invention, that optical means may be utilized for positioning the human head, including the simultaneous vertical and horizontal orientation of the head for the sequential exposure over a period of time achieving exact positioning of a particular patient's head for each exposure in the sequence of X-rays and/or photographs. In this connection, light beams are utilized, which are projected on certain areas of the patient's head for providing the proper fixation and/or positioning, thus eliminating the use of a mechanical device against the patient's head, and the concomitant discomfort from such utilization. A light beam projector is disposed adjacent the X-ray machine, which projects a cross-shaped beam with a vertical and a horizontal component. The horizontal component of the light beam is in the same horizontal plane as the X-ray beam, the Frankfort horizontal. In other words, the axis of the horizontal light beam and the axis of the central X-ray are in the same plane. Furthermore, a reflecting mirror is positioned at an angle approximately 45° to these axes directly to one side of the patient's head so as to reflect both the vertical and horizontal components of the light beam onto a second side of the patient's head in order to provide a three-dimensional view thereof.

For example, if a lateral view of the patient's head is desired (profile), the X-ray cassette would be positioned on one side of the patient's head adjacent his ear, and on the side opposite from where the X-ray machine and light beam projector are positioned. The reflecting mirror is positioned directly in front of the patient's face at an angle substantially 45° to the axis of the light beam projector and X-ray. Thus, projection of the horizontal component of the light beam will show directly against the porion and orbital on one side of the patient and will be reflected against the orbital and porion area on the other side of the patient through the reflecting mirror reflecting the horizontal component of the light beam against the particular side of the patient. The vertical component of the light beam will be reflected against the mirror also, and when the patient's head is positioned correctly (that is the yaw position), the vertical component of the light beam will pass along the sagittal plane of the head, which is a vertical plane mid-way between the right and left porion and perpendicular to the Frankfort plane.

In this connection, it should be understood that the various planes discussed here are geometric as opposed to anatomic. Furthermore, medio-lateral plane is one that passes through the right and left porion and is vertically disposed and perpendicular to both the Frankfort and sagittal planes. Moreover, the porionic (or medio-lateral) axis, for the purpose of understanding this invention, is a line connecting the right and left porion and "pitch" may be defined as a rotation on this axis.

The antero-posterior axis is the intersection of the Frankfort and sagittal planes, and rotation on this axis is called "roll", the tilting of the head to the right or left. The vertical axis is the axis perpendicular to the Frankfort plane at the intersection of the porionic and antero-posterior axes. Rotation on this axis is called "yaw" or the turning of the head to the right or left. Again, "rotation" as used here, is a geometric and not an anatomic or physiological description.

Further, in accordance herewith, a light beam projection box is utilized for positioning in place of the patient's head prior to the patient being positioned, in order for the apparatus to be so adjusted that the various light beams are in their proper initial alignment prior to the positioning of the patient, in order to further eliminate any discomforture on the part of the patient in having to sit for long periods of time prior to an X-ray or photograph exposure before the actual exposure takes place.

In addition, it should be understood that the arrangements herein are especially appropriate for converting prior art mechanical type positioners to optical merely by utilizing portions of the mechanical positioners to provide initial tactile contact. Thereby, installation of the reflecting mirror and the light beam projector according to the teachings herein, the methods in accordance herewith, may be utilized.

Accordingly, one object of this invention is to provide methods and apparatus for the positioning of a patient's head for a subsequent photographic or X-ray exposure substantially in the absence of the application of mechanical devices to the patient's head. In addition, it is another object of this invention to utilize optical means for the positioning of the patient's head in the form of light beams. It is a further object of this invention to provide for the three-dimensional positioning of the patient's head by optical means including simultaneous vertical and horizontal orientation, so that the patient's head can be effectively repositioned in exactly the same place and manner over a period of time in order to provide a sequence of photographs of a desired portion of the patient's anatomy.

It is an object of this invention, further, to provide methods and apparatus of the character described which is especially appropriate for use in converting prior art mechanical positioners to optical ones, in accordance herewith.

In considering generally the conditions in connection herewith, which conditions are more specifically set forth below, one may note that the head may be oriented in two steps. To prevent the head from swaying, a single light tactile contact is enough. Thus, a light touch of someone else's finger at the top of the head suffices. In practice, an approximate position is stabilized by tactile means such as, for example, the light mechanical contact at the top of the head, at the bridge of the nose or even a single ear post. This slight touching is enough to give the subject an awareness of position and thus avoid swaying of the head. Subsequently, precise orientation is then accomplished optically by directing the patient to nod, tilt or turn the head until the appropriate position is obtained in accordance herewith.

With the foregoing and additional objects in view, this invention will now be described in more detail, and other objects and advantages thereof will become apparent from the following description, the accompanying drawings, and the appended claims.

In the drawings:

FIG. 1 is a somewhat diagrammatic top plan view of apparatus embodying and for practicing this invention and showing one arrangement of the position of the patient with respect to the X-ray projector and the light beam projector, in accordance herewith, for taking a lateral X-ray exposure of the patient's head; and FIG. 2 is a somewhat diagrammatic side prospective view of the arrangement of FIG. 1;

Figure 1:
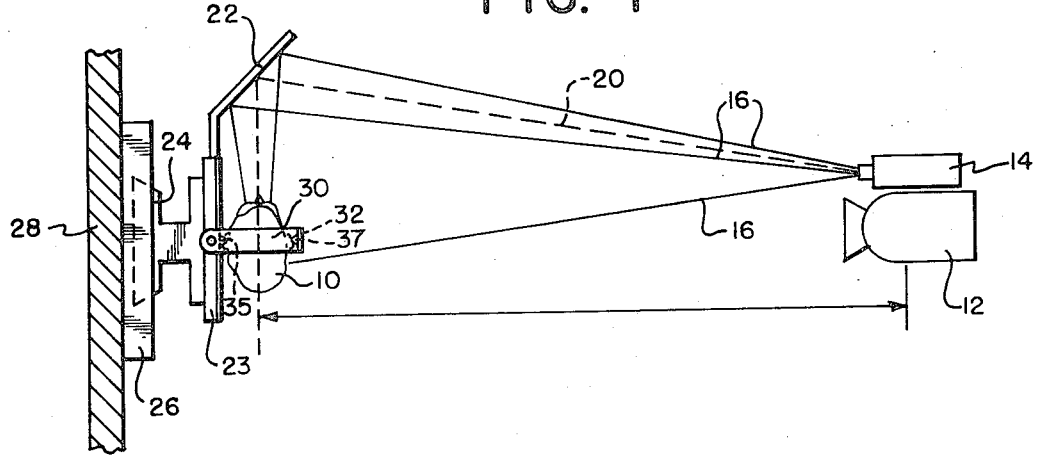

Referring to the drawings in which the like reference characters refer to like parts throughout the several views thereof, an illustrative embodiment of apparatus for practicing this invention is comewhat diagrammatically depicted in FIG. 1 as having a patient 10 disposed adjacent an X-ray cassette 23, so that a lateral X-ray (right-hand side), may be taken of the patient's head by X-ray machine 12. As can best be seen in FIG. 2, the X-ray cassette 23 is supported by a bracket arrangement 24 mounted for vertical displacement along vertical rack 26 by any suitable means for moving the bracket 24, such as, for example, screw and pinion arrangement 25. The vertical rack 26 is, in turn, supported on wall 28.

As can be seen in FIG. 1, a light beam projector 14 is disposed adjacent the X-ray machine 12 in a manner so that the axes of the light beam projector 14 and the X-ray machine 12 are disposed in the same horizontal plane. Light beam projector 14 may be mounted directly on X-ray projector 12, or alternatively mounted independently. However, X-ray 12 and light beam projector 14 must always be synchronized so that the horizontal light beam and central X-ray are in the same horizontal plane. Only if the X-ray head is fixed can the light beam projector be fixed.

Reflecting mirror 22, which is preferably a first surface mirror, is disposed at an angle to the parallel axes of light beam projector 14 and X-ray machine 12, as well as at an angle to a vertical plane passing through the mid-point of the patient's head. The angle of the mirror to both these reference planes will be within the range of between about 40°–50°, and preferably 45°.

Figure 2:
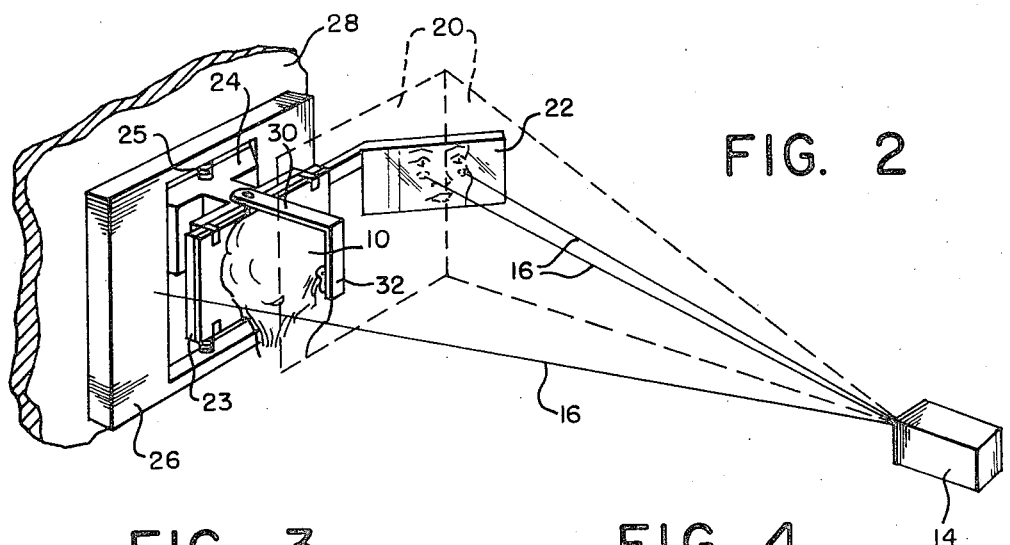

As can best be seen in FIG. 2, a longitudinally extending bracket 30 is pivotally disposed on bracket 24 for extension over the patient's head. Bracket 30 serves to support a depending bracket 32 which extends down along one side of the patient's head and has disposed thereon, an ear post 35 for insertion into the meatus of the patient's ear. A similar depending bracket 33 (not shown) is disposed on the opposite side of the patient's head with an ear post 37 for insertion into the opposite meatus of the patient. With such an arrangement, an initial approximate positioning of the patient's head is provided and the ear posts serve to cause the patient to hold his head in a stabilized position. Because final positioning, in accordance herewith, will be done by optical means, no further mechanical contact is necessary with the patient for taking a lateral view thereof. Furthermore, the ear posts need only touch slightly in the surface of the meati of the patient's ears in order to provide the desired stabilization, as discussed above.

Light beam projector 14 has disposed therein, a slide for projecting a cross-shaped light beam. As can be seen in FIG. 1, the horizontal component 16 of the light beam projected, extends from a point immediately behind the right ear of the patient over to, and including most of the surface of mirror 14. With such an arrangement, the reflected portion of horizontal component 16 reflects on the left-hand side of the patient's face, while the direct beam of the horizontal component 16 shines directly on the right-hand side of the patient's face. With this arrangement, the Frankfort plane which passes through the right and left porion and the left orbital of the patient's head can be displaced parallel with the light beam component 16 and parallel with the supporting floor, thus correcting the horizontal component with respect to the "pitch" and with respect to the tilting of the head or "roll".

Figure 3:
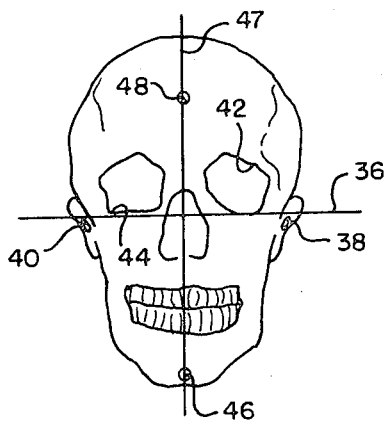
FIG. 3 is a view in elevation of a patient's face, indicating various points of the anatomy used in accordance herewith.

In other words, in referring to FIG. 3, the Frankfort plane 36 is shown passing through the left porion 38 and the right porion 40 of the patient, as well as the left orbital 42 of the patient's left eye.

As can be seen in both FIGS. 1 and 2, light beam projector 14 also projects a vertical component 20 of the cross-shaped light beam which vertical component is reflected against mirror 22 and substantially along the mid-point of the patient's head as viewed from the face. This vertical component 20 of the cross-shaped light beam serves to correct the "yaw" of the patient's head or the turning thereof to the right or left. This is done by correcting the position of the head so that the vertical component 20 of the cross-shaped light beam passes through the sagittal plane 47 of FIG. 3, which passes through, in turn, the glabella 48 on the patient's forehead and the pogonion 46 on the patient's chin.

Figure 4:
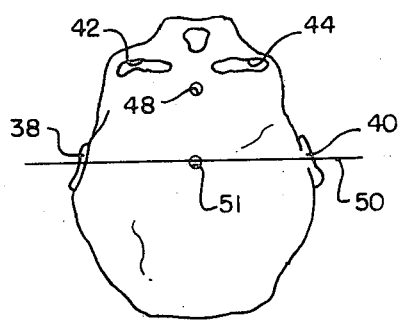
FIG. 4 is a top plan view of FIG. 3.

FIG. 4 shows the top of the patient's head and the medio-lateral plane 50 which passes through the left and right porion 38 and 40, respectively. This plane is a vertical plane and is perpendicular to both the Frankfort and the sagittal planes. Furthermore, plane 50 passes through vertical axis 51 around which the head rotates from right to left for determining the "yaw" position of the head. Again, it should be emphasized that all of these terms such as plane and axis are geometric and not physiological or anatomical.

Figure 5:
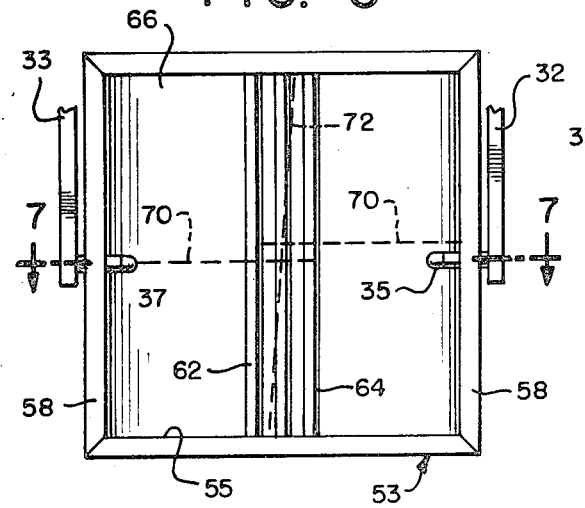
FIG. 5 is a front elevational view of another aspect of apparatus embodying and for practicing this invention and showing the calibration box which is used in substitution for the patient's head prior to the positioning of the patient's head, and showing the projected light beam in misalignment.

FIG. 5 shows a further feature of this invention in the form of a calibration box 53 which is used for the initial positioning of the light beams by the insertion of the calibration box 53 in the position of the patient's head prior to the patient sitting in that position. That is, calibration box 53 is disposed between brackets 32 and 33, respectively, depending from bracket 30, not shown, which ordinarily would extend over the patient's head. Calibration box 53 may be constructed of two rectangular shaped frames 58 and 60, with the front frame 58 being larger in dimension than the rear frame 60. These frames serve as a support for the generally trapezoid-shaped floor 55 and top 56 of the calibration box 53. Extending between the floor 55 and top 56 are two dowels 62 and 64, which are disposed near the rear frame 60 of calibration box 53. A generally translucent flexible material 66 is disposed to extend from the left-hand side of frame 58 as viewed in FIG. 5, around the rear of dowels 62 and 64 to the right-hand side of frame 58, as viewed in FIG. 5 with the ends of material 66 secured to frame 58. Two fine lines 68, such as India ink lines, are disposed at the midpoint between dowels 62 and 64 on the translucent material 66. Preferably, they are 3mm apart.

Figure 6:
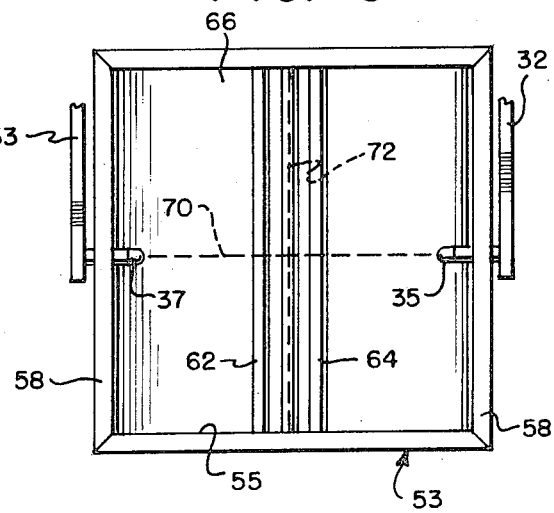
FIG. 6 is the same view as FIG. 5, with the light beams shown in proper alignment.

With such an arrangement, when calibration box 53 is suspended on brackets 32 and 33 in the same manner as a patient's head, the general positioning of the cross-shaped projected light beam can be determined. In FIG. 5, positioning of the reflection of horizontal component 16 of the light beam is shown at 70 when the calibration box 53 is tilted out of alignment. Furthermore, as can be seen in FIG. 5, the reflection 72 of vertical component 20 is not parallel with the India ink lines 68. FIG. 6 shows the calibration box 53 with both the vertical component 72 and the horizontal component 70 of the light beam in proper alignment. With such an arrangement, the patient is not subjected to the initial positioning of the light beam in correct manner prior to his being placed in the apparatus, thus eliminating prolonged adjustments of the patient prior to his exposure to an X-ray film or photographic film.

Figure 7:
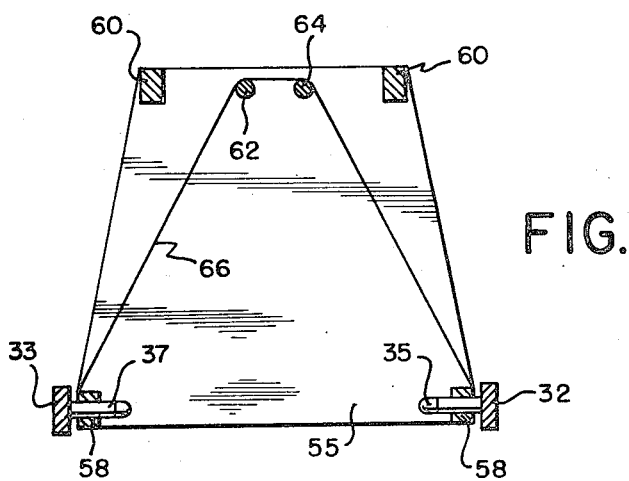
FIG. 7 is a sectional view of FIG. 5 taken along line 7—7 of FIG. 5.

FIG. 7 shows a cross-sectional view of the calibration box 53 of FIG. 5 along section lines 7—7 thereof, and indicates the relative position of the dowels 62, 64 with respect to the frames 58 and 60 as well as the arrangement of the translucent material 66. Calibration once completed need not be repeated unless the mirror or other part is disturbed.

Figure 8:
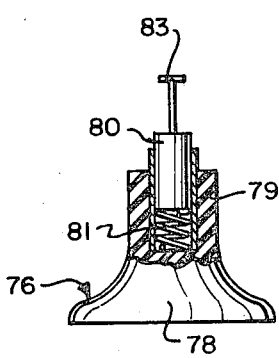
FIG. 8 is a longitudinal sectional view of further apparatus embodying and for practicing this invention, and showing one arrangement of a Nasion rest, in accordance herewith, for making light tactile contact of the patient during initial positioning.

FIG. 8 shows a cross-sectional view of a further feature of this invention utilized for the taking of postero-anterior views of the patient. In taking such views, the patient's head, as seen in FIG. 1 may be turned so that the face of head 10 will face cassette holder 23. In this position, bracket 30 holding the depending brackets 32 and 33 need not be utilized for the initial positioning of the patient's head through the use of ear posts. An initial tactile contact will be made with the nasion of the patient's head.

In this connection, a nasion positioner 76 is in the form of a suction cup comprised of a body portion 78 of flexible material such as rubber, as well known, which will adhere to the surface of cassette holder 23. Extending into flexible body portion 78 is a cylinder 79 which may be of any rigid material such as a non-flexible plastic or metal. Cylinder 79 extends out of the top of flexible material 78, as shown in FIG. 8. Disposed in cylinder 79 for sliding engagement therewith, is a piston-like member 80, which is so constructed with respect to cylinder 79 as to act with a smooth-like piston movement in cylinder 79. Piston 80 is urged outwardly from the bottom of cylinder 79 through the action of a spring 81 disposed between piston 80 and cylinder 79. A small T-shaped wire-like tactile point 83 is rigidly disposed on piston 80 for contact with the patient's nasion.

In use, the tactile point 83 is placed in the postero-anterior position facing the cassette 23, with point 83 in contact with the nasion of the head. Cassette holder 23 is raised or lowered until the head is in the Frankfort position. The latter is determined by the reflection of horizontal light beam 16 on the side of the head facing mirror 22 and against the porion and orbital on that side for adjusting pitch. Yaw and roll is observed. With such an arrangement, pitch, roll and yaw are visible simultaneously. With this arrangement, the reflection of the light beam on the right porion and right orbital, if coincident with the horizontal component of the beams checks the pitch and roll. If the nasion is in contact with the T-shaped contact point 83, "yaw" is checked.

Accordingly, and as will be apparent from the foregoing, there are provided in accordance herewith, methods and apparatus for the accurate displacement of a patient's head both horizontally and vertically for the exposure thereof to X-rays and/or photographs sequentially whereby the patient's head will always be positioned in the same position for each exposure in the sequence and in a manner whereby the patient is not subjected to prolonged positioning periods prior to exposure and is not subjected to the discomfort of irritating mechanical contacts with his head. Thus, such positioning is achieved rapidly by optical means substantially in the absence of any tight mechanical contact.

Obviously, all of the above serves to make the methods and apparatus in accordance herewith highly advantageous commercially because orthodontists, anthropologists, dentists, X-ray technicians and other health specialists for example, do not subject their patients to unnecessary discomfort while carrying out necessary procedures associated with their work.

While the methods and apparatus herein disclosed form preferred embodiments of this invention, this invention is not limited to those specific methods and apparatus, and changes can be made therein without departing from the scope of this invention, which is defined in the appended claims.

I claim:

1. A method for the three-dimensional positioning by optical means of a patient's head for radiation analysis or treatment by the simultaneous horizontal and vertical displacement thereof sequentially over a period of time in the same position for each period in the sequence, the steps which comprise projecting a cross-shaped light beam against the surface of the patient's head, said cross-shaped light beam having a horizontal component and a vertical component perpendicular to said horizontal component, disposing a reflecting mirror adjacent the patient's head with the reflecting surface thereof being disposed at an angle with the range of between about 40°–50° from the axis of said light beam and a vertical plane passing through the midpoint of the patient's head when said vertical plane is perpendicular to said light beam, adjusting the patient's head so that both the direct and reflected portions of said horizontal component are on the Frankfort plane of the patient's head and the said vertical component is on the sagittal plane of the patient's head, and projecting additional radiation toward the patient's head for performing analysis or treatment thereof.

2. The method as described in claim 1, in which said angle is 45°.

3. The method as described in claim 1, in which the said method is used for exposing said patient's head to a sequence of X-rays at intervals of time, and which includes the additional step of projecting X-rays against the same surface of the patient's head as said cross-shaped light beam is projected, the axis of said X-ray projection being coincident with the axis of said light beam projection.

4. A method as described in claim 1, which includes the additional step of positioning a calibrator in place of the patient's head prior to the positioning thereof, said calibrator being configured for the initial positioning thereof with respect to said light beam so as to avoid prolonged positioning of the patient's head.

5. Apparatus for the three-dimensional positioning by optical means of a patient's head for radiation analysis or treatment by the simultaneous horizontal and vertical displacement thereof over a period of time in the same position for each period in the sequence and having a source of light, the combination which comprises a cross-shaped projection plate means disposed between said source and a patient's head for providing a cross-shaped light beam the axis of which is horizontal, and said light beam having a horizontal component and a vertical component perpendicular to said horizontal component, a first surface reflecting mirror disposed adjacent the patient's head to be positioned with the reflecting surface thereof disposed at an angle within the range of between about 40°–50° from the axis of said light beam and a vertical plane passing through the midpoint of the head to be positioned when said vertical plane is perpendicular to the said axis of said light beam for reflecting the said vertical component along said vertical plane, and for reflecting said horizontal component on the side of the head to be positioned opposite from said source, and means for projecting additional radiation toward the patient's head for performing analysis or treatment thereof.

6. Apparatus as described in claim 5, which includes a source of X-ray radiation disposed adjacent said light source for projecting a beam of X-rays against the surface of a patient's head to be positioned, the axis of said X-ray beam being in the same plane of said light beam, support means disposed on the side of the patient's head to be positioned opposite said light source and said X-ray source, an X-ray cassette disposed on said support means for holding X-ray film to be exposed, and said cassette being disposed for slidable vertical engagement with said support.

7. Apparatus as recited in claim 6, which includes a horizontal longitudinally extending bracket, one end of which is connected to said cassette, said bracket extending over the head of a patient to be positioned, a pair of descending arms connected to said bracket for extending along each side of the head of a patient to be positioned, an ear post disposed on each of said arms, said ear posts being diametrically opposed for insertion into the meati of the ears of a patient to be positioned, whereby insertion of said ear posts provides initial coarse positioning of the head of a patient to be positioned.

8. Apparatus as recited in claim 7, which includes a calibration box for positioning in place of a patient's head to be positioned for the initial positioning of said light beam, said calibration box being comprised of a generally trapezoid shaped top and bottom, a front frame extending between said top and bottom, a rear frame extending between said top and bottom at the side thereof opposite said front frame, a pair of dowels disposed adjacent said rear frame and extending from said top to said bottom, a sheet of flexible translucent material extending from one side of said front frame around said dowels to the other side of said front frame, said material having a pair of vertical calibration lines disposed thereon midway between said dowels, whereby reflection of said light beam on said material provides initial positioning of said light beam when the vertical component thereof is disposed equidistant between said calibration lines and parallel thereto, and the reflection of said horizontal component on said material on each side of said dowels is on a continuously horizontal plane.

9. Apparatus as recited in claim 6, which also includes a nasion tactile element for contact with the nasion of a patient to be positioned, said element comprising a generally flexible material one end of which is in the form of a suction cup for adherence and positioning on said cassette, a cylinder disposed in said element at the end thereof opposite said suction cup portion, a piston disposed in said cylinder, resilient means disposed between said piston and said cylinder, and a nasion engaging piece disposed on said piston on the end thereof opposite said resilient means.

* * * * *